Patented Jan. 11, 1949

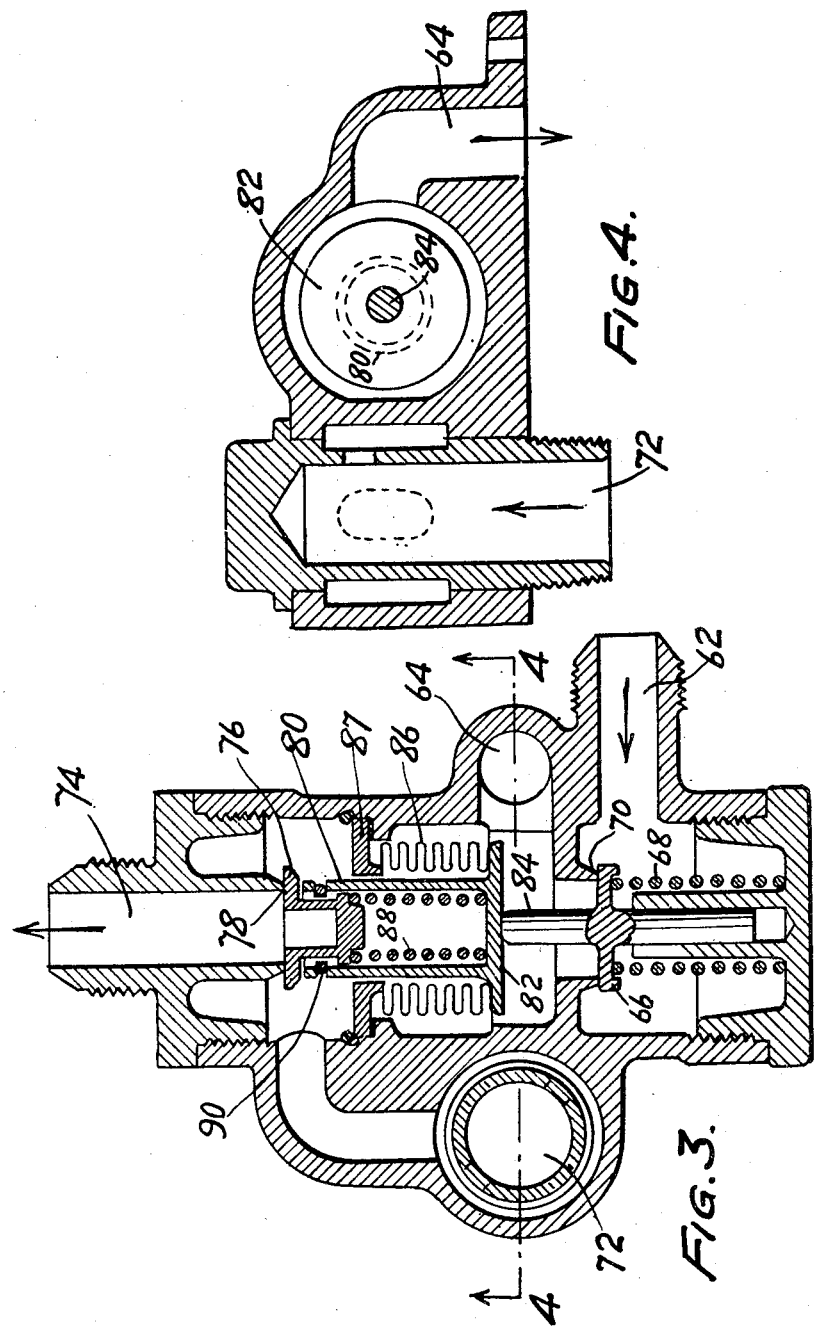

2,458,763

UNITED STATES PATENT OFFICE 2,458,763

LUBRICATING SYSTEM FOR MECHANISMS OPERATING AT HIGH ALTITUDES

Rudolph Birmann, Newtown, Pa., assignor, by mesne assignments, to Turbo Engineering Corporation, a corporation of Delaware Application May 13, 1944, Serial No. 535,412

4 Claims. (Cl. 184—6)

This invention relates to lubricating means particularly designed for insuring positive lubricating action of mechanisms used in aircraft and, in particular, for the lubrication of turbine or turbo compressor plants used for supercharging or for the production of mechanical power.

The positive lubrication of mechanisms in aircraft is complicated by the existence of low atmospheric pressures which greatly reduce the effective pressure on lubricating oil as it passes to a pump and which also cause relatively large volumes of air to accompany oil which has accumulated in a sump following its lubricating function and which is to be returned to a supply tank. To insure a proper supply of lubricant, the supply tank, therefore, is located above the pump or pumps involving a further disadvantage that when the system is not operating, flow of lubricant from the tank may occur by leakage from the pump or the parts being lubricated. This disadvantage could be readily overcome at sea level by the provision of suitable check valves opening under atmospheric pressure as soon as the pumping system operates. However, at high altitudes, the atmospheric pressure is so low that valves sufficiently positive to be effective for the purpose just indicated may not open sufficiently readily to permit proper feed to the lubricating pressure pump.

It is the object of the present invention to provide a lubricating system which is capable of operating properly at high altitudes but which will also close off the lines from the supply tank to the pump when the pumping unit is not operating and which will also insure a proper sequential operation of valves. These general objects of the invention and other objects, particularly relating to details, will become apparent from the following description read on in conjunction with the accompanying drawings in which:

Figure 3 is a sectional view of another modified valve system also adapted to be associated with pressure and scavenging pumps; and Figure 4 is a section of the valve arrangement of Figure 3 taken on the plane, the trace of which is indicated at 4—4 in Figure 3.

Figure 1:
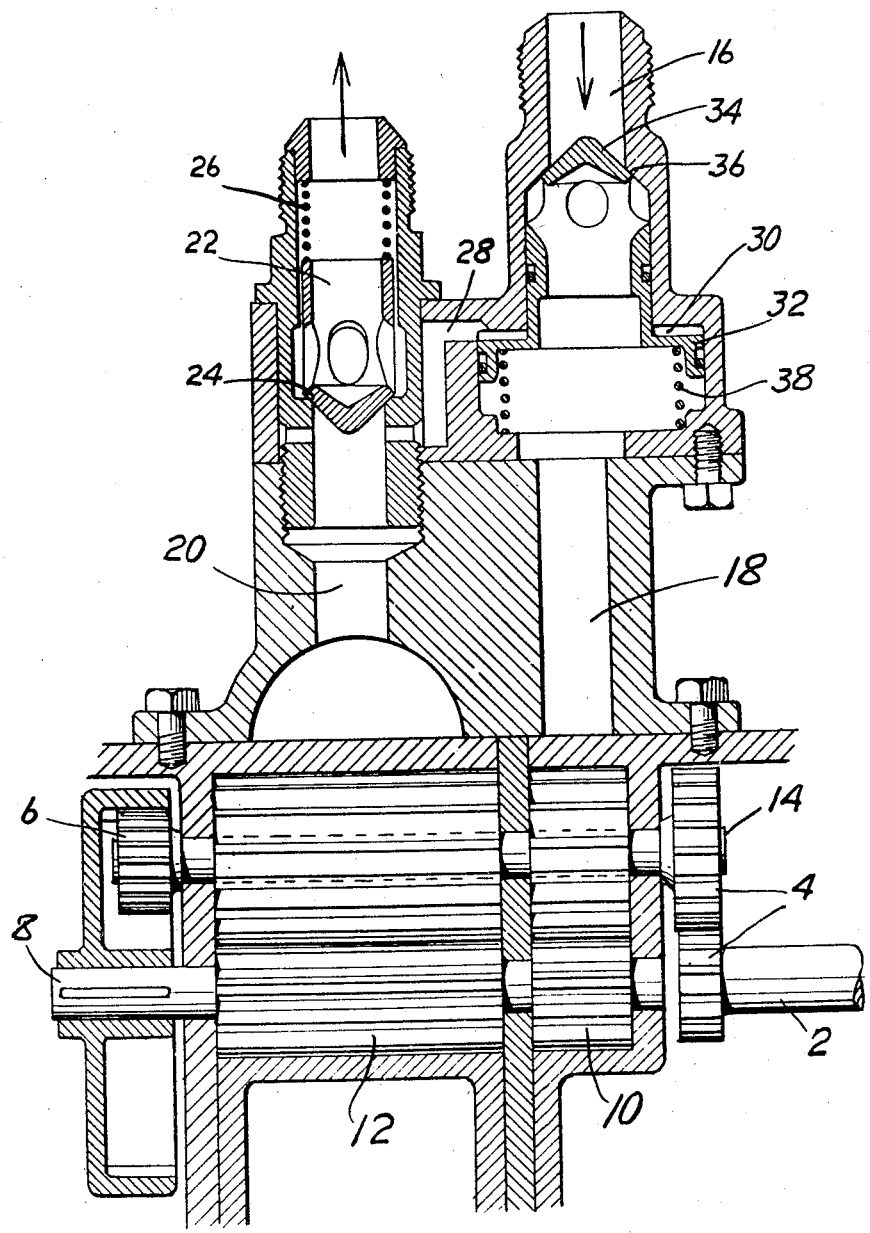
Figure 1 is a sectional view showing pressure and scavenging lubricant pumps in association with a valve system to insure proper control of flow.

Referring first to Figure 1, there is indicated at 2 a shaft for driving the lubricating pumps, which shaft may be the shaft of a turbine of a turbo compressor unit used either for supercharging or for the development of mechanical or other power, the power plant being that which is to be lubricated by the action of the pumps. The shaft 2 drives through reduction gearing 4 and 6 the shaft 8 common to the lubricant pressure pump 10 and the scavenging pump 12 which are conventional in form and which may be of the ordinary gear type. (The shaft 14 connecting the reduction gear pairs passes freely through the driven elements of the pumps and serves as their journal.) The pressure pump 10 receives a supply of lubricant through the line 16, 18 from a supply tank (not shown) and delivers the lubricant under pressure to the bearings or other parts requiring lubrication. The scavenging pump 12 picks up the oil which has been used from a sump and delivers it through the line 20 either directly to the lubricant supply tank or through a suitable cooler. The scavenging pump has several times the capacity of the pressure pump inasmuch as it may be called upon to handle a considerable amount of air along with the lubricant, this air being separated in the supply tank. The system so far described is conventional.

In the line 20 through which the scavenging pump 12 discharges is a valve 22 seated at 24 under the action of a spring 26. As will be pointed out hereafter, the spring 26 has a definite strength related to the other parts of the system to secure a proper sequential action of the valve 22.

A connection 28 joins the portion of the line 20 below the valve 22 with the space 30 above a piston 32 slidable in a cylinder forming part of the line 16, 18. The piston 32 carries a valve 34 which seats at 36 to close the line to the pressure pump. A spring 38 urges the piston upwardly and the valve 34 toward its seated position.

The spring 26 is made sufficiently strong that the valve 22 cannot open until sufficient pressure appears in the line 20 between it and the scavenging pump to open the valve 34 by pressure action upon the piston 32. The operation of the system is accordingly as follows:

When the unit is stationary, both valves 22 and 34 are firmly seated under the actions of their springs so as to isolate the supply tank and any parts connected therewith, including the external parts of the lines, from the pumps 10 and 12. Accordingly, despite any leakage which may exist in the pumps or in any of their connections, the lubricant cannot leak from the supply tank. At low altitudes it is possible that atmospheric pressure above the valve 34 may cause this valve to open immediately upon the beginning of operation of the pressure pump 10. However, at high altitudes, the pressure above the valve 34 may be quite low and represented by no more than the incidental head of liquid above the valve and the low atmospheric pressure. Under these conditions, the positive opening of the valve 34 is insured by reason of the connection 28 and the piston 32. As operation begins, the scavenging pump 12 will generally be in condition to pump oil into the line 20. However, even if leakage has occurred, the gears of the pump will contain residual oil so that it will at least be in condition to pump air. It will, therefore, build up below the valve 22 a fluid pressure which, transmitted through the connection 28, will act upon the piston 32 and cause the valve 34 to be positively opened. Thus, lubricant is applied to the pressure pump 10, which lubricant, after effecting its lubricating action, will pass to the sump from which the scavenging pump 12 draws its supply. After the pump 12 is properly operating with lubricant, the pressure in the line 20 will become sufficient to raise the valve 22 from its seat so as to open the scavenging line with the result that a complete circulation of the lubricant will take place and normal operation will occur.

Figure 2:
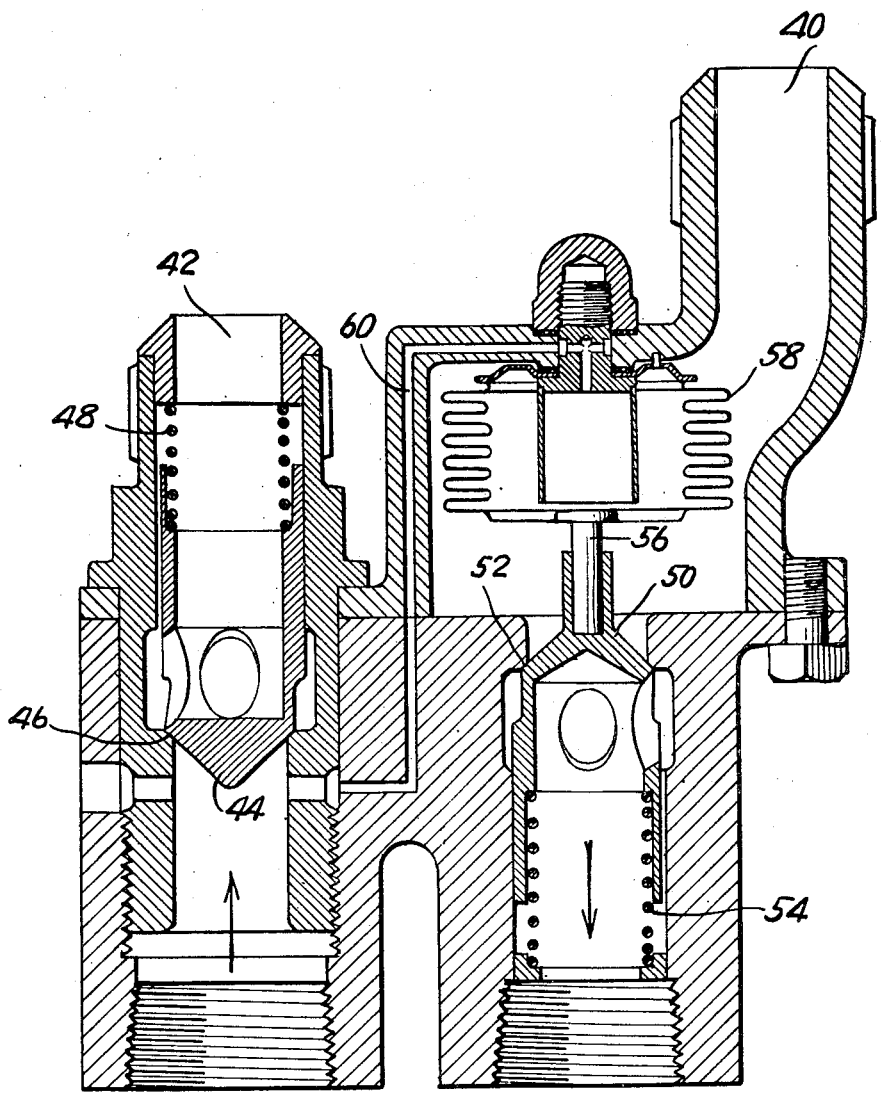
Figure 2 is a sectional view showing an alternative valve system designed to be associated with similar pumps.

The use of a piston such as 32 creates some friction which, under some conditions, might give difficulty by keeping the valve 34 from properly opening, though, in general, the arrangement of Figure 1 is satisfactory, particularly if sufficient area is given to the piston 32. To avoid such frictional action, however, the modified arrangement of Figure 2 may be adopted, in which passage 40 corresponds to the passage 16 and passage 42 corresponds to the passage 20, the former leading to the pressure pump and the latter from the scavenging pump. A valve 44 in the line 42 seated at 46 under the action of spring 48 serves the same purpose as the valve 22 of Figure 1. In the modification of Figure 2, however, the valve 50, corresponding to valve 34 and pressed into seated condition at 52 under the action of spring 54, has a stem connected to an expansible chamber 58, the interior of which is connected by passage 60 to the region below the valve 44. The sequential operation in the case of the modification of Figure 2 is the same as that of Figure 1. Spring 48 is sufficient to maintain the valve 44 seated until the required pressure is built up in connection 60 and the interior of the expansible chamber 58 to open the valve 50. Thereafter, as operation occurs, a still higher pressure will build up below the valve 44 to cause it to open so that normal lubricating action will take place.

The modification of Figures 3 and 4 provides a still more positive control of the valve in the line leading to the pressure pump. In this modification, the pressure pump is supplied from the supply tank through the connections 62 and 64 in which is interposed a valve 66 seated at 70 under the action of a spring 68. The flow from the scavenging pump takes place through the connections 72 and 74 controlled by a valve 76 seated at 78. Arranged between the two valves is a sleeve 80 having a head 82 engageable with the stem 84 of the valve 66. An expansible chamber 86 is connected to the head 82 of the sleeve and a partition 81 secured to the valve housing through which passes the sleeve 80 with sufficient clearance to permit fluid to enter the chamber 86. A spring 88 reacts between the valve 76 and the head 82 of the sleeve 80. A split ring 90 extending inwardly in slots in the sleeve 80 is adapted to engage a head on the valve 76 so that as the sleeve 80 moves downwardly beyond a predetermined degree, the valve 76 will be removed from its seat 78.

In this arrangement, as in the others, the sequence of operation involves first an opening of the valve 66 in the line between the supply tank and the pressure pump, followed, after operation begins, by sufficient downward movement of the sleeve 80 to engage the valve 76 and open it. It will be evident that the valve 66 in this arrangement must open before the valve 76. It may also be noted that as soon as the sleeve 80 moves sufficiently downwardly to engage and remove the valve 76 from its seat, the spring 88 becomes completely ineffective as a mere element of an assembly moving as a unit. The spring 68 in this modification is sufficiently stronger than the spring 88 so that when the unit is idle, both valves 66 and 76 will be seated.

What I claim is:

1. In a lubricating system for aircraft mechanisms operating at high altitudes, a pressure pump, a scavenging pump, a lubricant supply line to the pressure pump, a lubricant return line from the scavenging pump, a valve in said supply line, a valve in said return line, connections between the valve in the supply line and a part of the return line between the scavenging pump and the valve in the return line through which pressure in said part of the return line may effect opening of the valve in the supply line, and means for maintaining the valve in the return line seated until the valve in the supply line is opened.

2. In a lubricating system for aircraft mechanisms operating at high altitudes, a pressure pump, a scavenging pump, a lubricant supply line to the pressure pump, a lubricant return line from the scavenging pump, a valve in said supply line, a valve in said return line, connections between the valve in the supply line and a part of the return line between the scavenging pump and the valve in the return line through which pressure in said part of the return line may effect opening of the valve in the supply line, and means for maintaining the valve in the return line seated against pressure in said part of the return line until the valve in the supply line is opened.

3. A lubricating system for aircraft parts comprising a supply tank arranged above the level of the part to be lubricated, a feed pump and a scavenging pump, connections between the pumps and the tank, a valve unit arranged in the connections, said valve unit including a casing having a feed valve and a return valve therein biased toward closed position to disconnect the pumps from the tank, said valve unit also including means subject to pressure of fluid from the scavenging pump for opening the feed valve and subsequently opening the return valve.

4. A lubricating system for aircraft parts comprising a supply tank arranged above the level of the part to be lubricated, a feed pump and a scavenger pump, connections between the pumps and the tank, a valve unit arranged in the connections, said valve unit including a casing having a feed valve and a return valve therein biased toward closed position to disconnect the pumps from the tank, pressure operated means in the scavenger side of the valve casing to actuate said valves, said pressure operated means being adapted to mechanically open the feed valve, and a lost motion connection between the pressure operated means and the return valve to delay opening of the return valve until after the feed valve has been opened.

RUDOLPH BIRMANN.

REFERENCES CITED

The following references are of record in the file of this patent:

UNITED STATES PATENTS

| Number | Name | Date |
| --- | --- | --- |
| 2,263,414 | Beneshek | Nov. 18, 1941 |
| 2,336,480 | Grantz | Dec. 14, 1943 |